United States Patent [19]

Liegel et al.

[11] Patent Number: 4,715,789
[45] Date of Patent: Dec. 29, 1987

[54] HIGH SPEED HYDRAULIC FLUID VENTING VALVE IN A HYDRAULIC FLUID PUMP

[75] Inventors: Reinald D. Liegel; James G. Ballard, both of Waukesha, Wis.

[73] Assignee: Hein-Werner, Inc., Waukesha, Wis.

[21] Appl. No.: 839,977

[22] Filed: Mar. 17, 1986

[51] Int. Cl.$^4$ .............................................. F16D 31/00
[52] U.S. Cl. ..................................... 417/253; 60/468; 417/299
[58] Field of Search ................... 417/253, 299; 60/468

[56] References Cited

U.S. PATENT DOCUMENTS

| | | | |
|---|---|---|---|
| 3,704,588 | 12/1972 | Trabbic | 417/299 X |
| 3,889,709 | 6/1975 | Dwyer | 417/299 X |
| 3,948,147 | 4/1976 | Sauer et al. | 417/299 X |
| 3,976,090 | 8/1976 | Johnson | 417/299 X |

Primary Examiner—Carlton R. Croyle
Assistant Examiner—Theodore Olds
Attorney, Agent, or Firm—Michael, Best & Friedrich

[57] ABSTRACT

A valve assembly for controlling discharge of hydraulic fluid from a high pressure hydraulic fluid container to a hydraulic fluid reservoir and including a valve body having a valve bore, a fluid inlet port communicating with the valve bore on one side of a valve seat, and a fluid outlet port communicating with the valve bore on an opposite side of the valve seat. A valve spool is housed in the valve bore and includes a valve member selectively engageable with the valve seat to prevent hydraulic fluid flow through the valve bore. The valve member is selectively biased against the valve seat by a valve piston housed in a valve cylinder, the valve piston being operably connected to the valve member such that hydraulic fluid pressure in the valve cylinder biases the valve member toward the valve seat. A compression spring is also provided for resiliently biasing the valve member away from the valve seat such that the valve member will move away from the valve seat when the hydraulic fluid pressure in the valve cylinder falls below a predetermined pressure.

6 Claims, 6 Drawing Figures

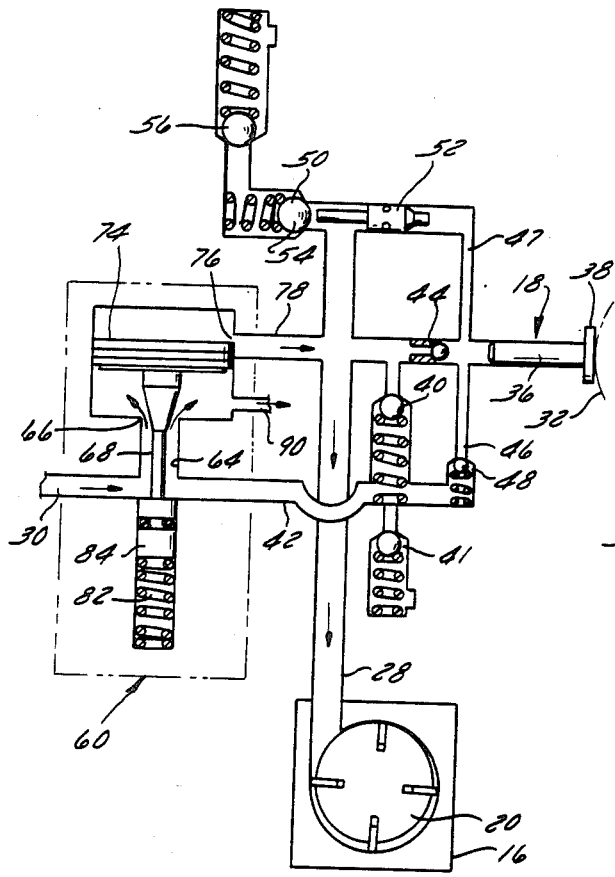
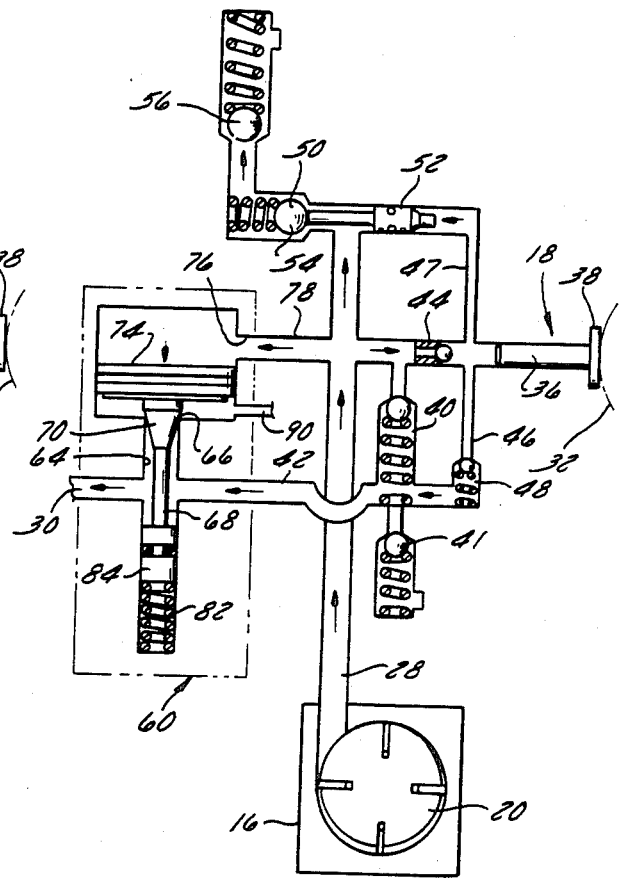
FIG. 3    FIG. 2
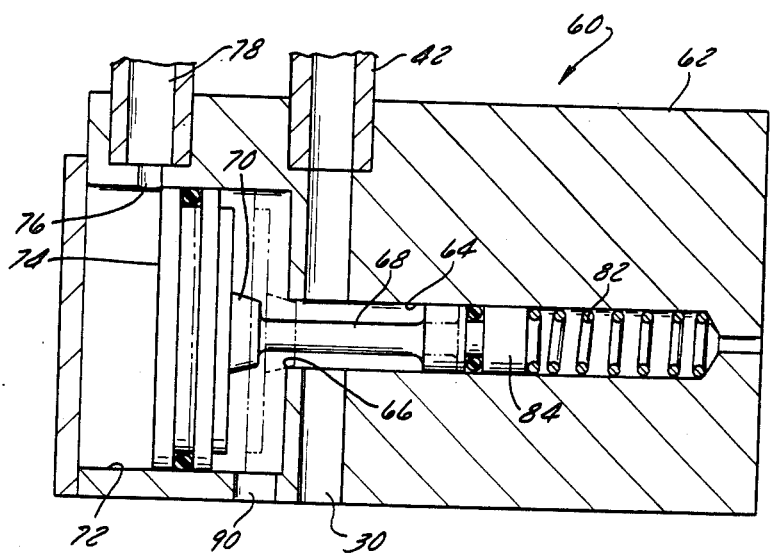
FIG. 6

HIGH SPEED HYDRAULIC FLUID VENTING VALVE IN A HYDRAULIC FLUID PUMP

FIELD OF THE INVENTION

The present invention relates to hydraulic fluid pumps and more particularly to hydraulic fluid pumps including a low pressure, high fluid volume pump and a high pressure, low fluid volume pump and having a valve for selectively venting hydraulic fluid to a hydraulic fluid reservoir.

BACKGROUND PRIOR ART

The use of relatively small hydraulic cylinders is common in many industrial and construction applications. Such applications include Pipe bending, hose crimping, portable hydraulic presses, portable lift jacks, maintenance equipment, etc. Hydraulic fluid is supplied to hydraulic cylinders of such apparatus by relatively portable hydraulic fluid pumps driven by electric motors, small gasoline engines or compressed air motors.

In operation of such hydraulic fluid pumps, hydraulic fluid is forced into a hydraulic cylinder to perform the required work, and then a fluid venting valve will permit return of the hydraulic fluid back to the hydraulic fluid reservoir of the hydraulic fluid pump. In many applications of the prior art hydraulic fluid pumps, venting of hydraulic fluid from the hydraulic cylinder is relatively slow and limits the speed of operation of the hydraulic fluid pump. For example, in the operation of a hose crimping machine of the type commonly used to swage a coupling onto the end of a hydraulic hose, the cycle time for the hydraulic fluid pump supplying hydraulic fluid to a hydraulic cylinder of the hose crimping machine may limit the operator's efficiency in swaging couplings on the ends of the hydraulic hoses.

Prior art hydraulic fluid pumps for use in such applications commonly include an electric motor which drives a low pressure high volume impeller pump and a high pressure low volume piston pump. A ball check valve is provided to selectively permit hydraulic fluid to return to the pump reservoir from a hydraulic cylinder supplied with hydraulic fluid by the pump. The check valve includes a small diameter passage selectively closed by a ball positioned against a valve seat. The ball is held against the valve seat by a relatively large diameter valve piston housed in a valve cylinder provided in the valve. Hydraulic fluid from the impeller pump is supplied to the valve cylinder to cause the valve piston to apply a seating force on the ball.

In normal operation of such prior art pumps, the low pressure impeller pump will maintain a pressure in the cylinder of approximately 120 psi. The high pressure piston pump, on the other hand, may generate a pressure of 10,000 psi which acts to force the ball away from its valve seat. Accordingly, the surface area of the valve piston must be much greater than the cross sectional area of the valve seat if the 120 psi pressure in the valve cylinder is to be effective to hold the ball against the valve seat. In practice, the discharge or vent passage and the valve seat of the valve normally have a diameter as small as 0.10 inches. Due to the small diameter of the vent passage, when the hydraulic cylinder is vented, fluid flow through the vent passage is restricted.

SUMMARY OF THE INVENTION

The present invention provides an improved hydraulic fluid pump and an improved hydraulic venting valve embodied in the hydraulic fluid pump. The hydraulic fluid venting valve provides for rapid discharge of hydraulic fluid from a hydraulic cylinder and thereby facilitates high speed efficient operation of the hydraulic fluid pump.

More specifically, the hydraulic fluid pump embodying the invention includes a valve assembly for controlling discharge of hydraulic fluid from a high pressure hydraulic fluid container to a hydraulic fluid reservoir, the hydraulic fluid assembly having a valve body including a valve bore, and a valve seat. A first inlet port communicates with the valve bore on one side of the valve seat, and a first hydraulic fluid outlet port communicates with the valve bore on an opposite side of the valve seat. A valve member is housed in the valve bore and is selectively engageable with the valve seat to prevent hydraulic fluid flow through the valve bore. Means are also provided for selectively biasing the valve member against the valve seat, the means for biasing including a valve cylinder having opposite ends and a valve piston housed in the valve cylinder. The valve piston is operably connected to the valve member such that hydraulic fluid pressure in one of the opposite ends of the valve cylinder biases the valve member toward the valve seat. Means are also provided for resiliently biasing the valve member away from the valve seat such that the valve member will move away from the valve seat when the hydraulic fluid pressure in the valve cylinder falls below a predetermined pressure.

In a preferred embodiment of the invention the valve member is a spool valve having opposite ends, one of the opposite ends of the spool valve defining the valve member engageable with the valve seat.

In a preferred embodiment of the invention the means for resiliently biasing comprises a compression spring engaging an end of the spool valve to bias the valve member away from the valve seat.

In a preferred embodiment of the invention the valve member includes sidewalls defining an angle of approximately 15° with respect to the longitudinal axis of the valve bore.

Various other features and advantages of the invention will be apparent by reference to the following description of a preferred embodiment, from the drawings and from the claims.

BRIEF DESCRIPTION OF THE DRAWINGS

FIG. 2 is a schematic view of the hydraulic fluid pumping circuit of the hydraulic pump illustrated in FIG. 1 and showing the hydraulic circuit in a fluid pumping mode.

FIG. 3 is a view similar to FIG. 2 and showing the hydraulic fluid circuit in a fluid venting mode.

FIG. 6 is an enlarged illustration of the apparatus illustrated in FIG. 4.

Figure 1:
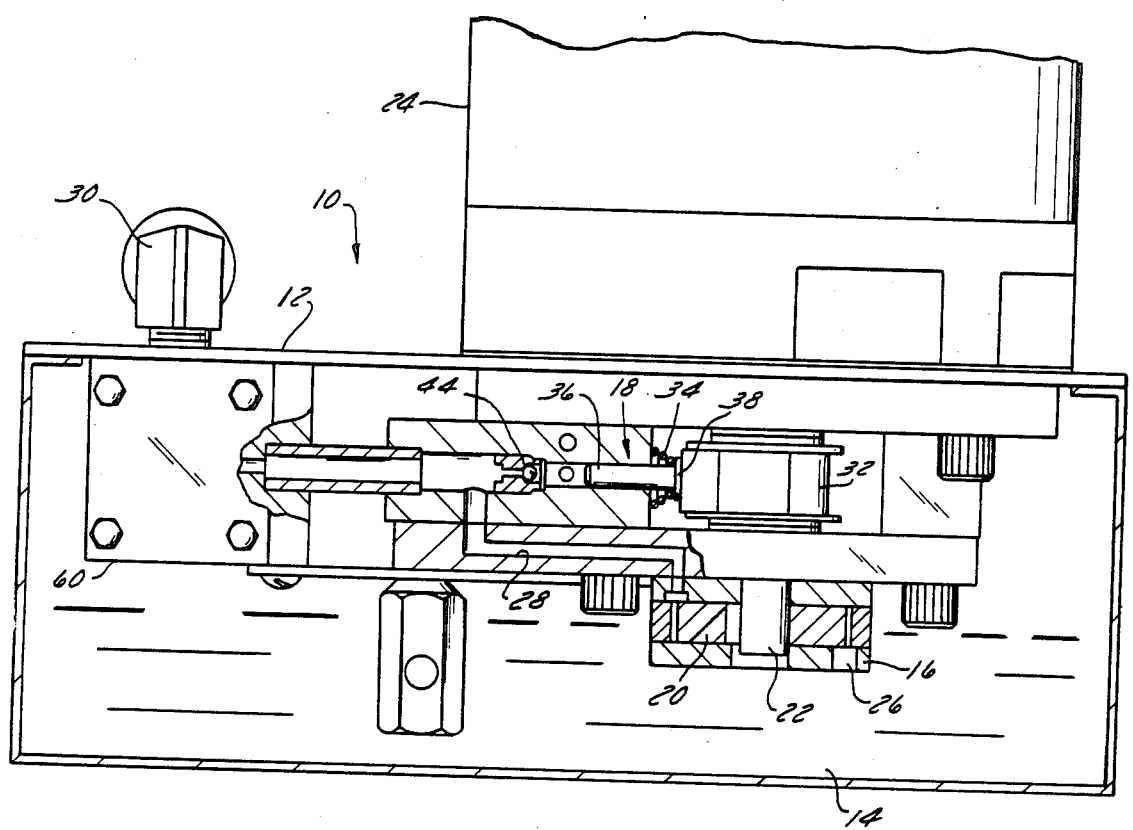
FIG. 1 is an elevation view partially in cross-section of a hydraulic pump embodying the present invention.
Figure 4:
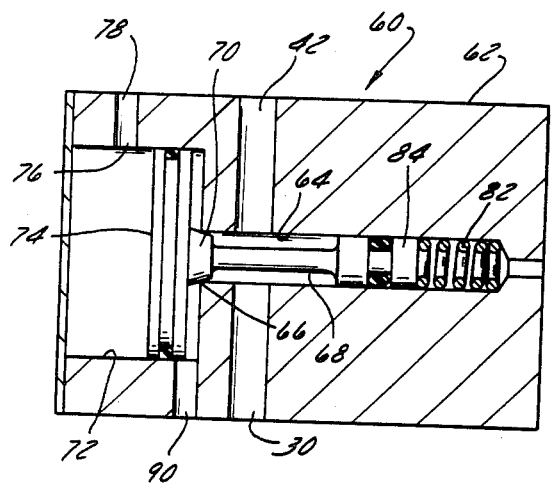
FIG. 4 is an enlarged cross section view of the hydraulic fluid venting valve of the hydraulic fluid pump shown in FIGS. 1-3.

Before explaining one embodiment of the invention in detail, it is to be understood that the invention is not limited in its application to the details of the construction and to the arrangement of the components set forth in the following description or illustrated in the drawings. The invention is capable of other embodiments and of being practiced and carried out in various ways. Also, it is to be understood that the phraseology and terminlogy employed herein are for the purpose of description and should not be regarded as limiting.

DESCRIPTION OF A PREFERRED EMBODIMENT

Illustrated in FIG. 1 is a hydraulic fluid pump 10 embodying the present invention and including a housing 12 having a reservoir 14 adapted to contain a supply of hydraulic fluid. The hydraulic fluid pump 10 includes a low pressure, high volume pump and a high pressure, low volume pump, the low pressure pump comprising a conventional impeller pump 16, and the high pressure pump being comprised of a conventional reciprocating piston pump 18. The impeller pump 16 includes a central rotary impeller 20 driven by the shaft 22 of an electrical motor 24, the electric motor 24 being supported by the housing 12. As the electric motor 24 causes rotation of the impeller 20, hydraulic fluid is pulled through a port 26 from the reservoir 14 and is forced through a discharge passage 28 toward a pump outlet connector 30. The connector 30 is adapted to facilitate connection of the hydraulic pump 10 to a hydraulic cylinder (not shown) in a conventional manner.

The high pressure reciprocating piston pump 18 includes a cam 32 supported on the output shaft 22 of the electric motor 24. A compression spring 34 surrounds a piston 36 and engages a head portion 38 of the piston 36 to maintain the piston in engagement with the cam 32. Rotation of the output shaft 22 of the electric motor 24 causes rotation of the cam 32 to thereby cause reciprocal movement of the piston 36 of the high pressure pump 18.

The operation of the hydraulic pump of the invention is illustrated schematically in FIGS. 2 and 3 of the drawings. As shown in FIG. 2, during initial operation of the hydraulic pump, the low pressure impeller pump 16 will cause fluid flow through a conduit 28 past a check valve 40 and through a second conduit 42 to the pump outlet port 30.

The piston pump 18 will also cooperate to draw hydraulic fluid past a check valve 44 from the conduit 28 and to pump hydraulic fluid through a conduit 46, past a check valve 48 and through the conduit 42 to the pump outlet port 30. A high pressure fluid relief valve 41 is also provided to vent hydraulic fluid to the reservoir 14 in the event the high pressure piston pump generates a pressure exceeding, for example, 10,000 psi.

During initial operation of the impeller pump 16, a spring biased check valve 50 will operate to maintain pressure in the conduit 28 of, for example, 350 psi. Once the pressure generated by the impeller pump 16 and by the high pressure pump 18 reaches a predetermined pressure, fluid pressure in conduit 47 will cause plunger 52 to force the ball 54 of check valve 50 away from its valve seat to thereby permit pressure in the conduit 28 to decrease to the pressure established by a second relief valve 56. The second relief valve may maintain, for example, 120 psi in the conduit 28. This arrangement provides for an initial high volume flow of hydraulic fluid from the impeller pump 16 to the hydraulic fluid cylinder until the pressure generated by the high pressure pump 18 reaches a predetermined pressure. The load by the low pressure impeller pump 16 on the motor 24 is then removed to permit the power output of the motor 24 to be used to drive the high pressure piston pump 18. During operation of the low pressure high volume impeller pump 16, as the pressure generated by the impeller pump increases, the load on the electric motor 24 will increase. In order to provide for transfer of the majority of the power output to the high pressure pump, once the lower pressure pump 16 reaches the predetermined pressure, the load on the impeller pump 16 is reduced and the power output available for operation of the high pressure pump 18 is then increased.

Means are also provided for venting hydraulic fluid pressure from the hydraulic fluid cylinder when the pump motor 24 is stopped. One embodiment of the means for venting is illustrated in FIG. 6 as including a valve assembly 60 including a valve body 62 having a central valve bore 64. The valve bore 64 includes a valve seat 66 and houses a valve spool 68 including one end defining a valve member 70 engagable with the valve seat 66.

Means are also provided for selectively applying a force on the end of a valve spool 68 to bias the valve member 70 into engagement with the valve seat 66. The means for applying a force on the end of the valve spool 68 includes a large diameter valve cylinder 72 housing a valve piston 74. A fluid port 76 connects the valve cylinder 72 to a passage 78 communicating with passage 28 such that the pressure in the valve cylinder 72 is generated by the impeller pump 16. The valve piston 74 acts on the valve member 70 such that hydraulic pressure in valve cylinder 72 and acting on the valve piston 74 applies a force on the valve member 70 to bias the valve member 70 into engagement with the valve seat 66.

The conduit 42 also communicates with the valve bore 64 intermediate the opposite ends of the valve spool 68 and such that when the valve member 70 is in engagement with the valve seat 66, as shown in phantom in FIG. 6, hydraulic fluid pressure on the opposite ends of the valve spool 68 is balanced.

Means are also provided for forcing the valve member 70 away from the valve seat 66 when the hydraulic fluid pressure in the valve cylinder 72 falls below a selected pressure. In the illustrated arrangement, this means includes a compression spring 82 housed in the valve bore 64 and engaging an end 84 of the valve spool so as to bias the valve member 70 away from the valve seat 66. The force generated on the valve spool 68 by the spring 82 is less than the force on the valve spool exerted by the valve piston 74 when the low pressure hydraulic fluid pump 16 is operating and generating a fluid pressure in the valve cylinder 72.

When the electric motor 24 is stopped, as illustrated in FIG. 3, hydraulic fluid will drain from the valve cylinder 72 through the impeller pump 16 back to the hydraulic fluid reservoir 14. The hydraulic fluid pressure in the valve cylinder 72 will thus decrease rapidly, and the spring 82 will force the valve member 70 away from the valve seat 66. The hydraulic fluid in the working hydraulic cylinder can then drain back through the discharge port 30 and through the vent passage 90 to return the hydraulic fluid to the reservoir 14 of the pump.

In the illustrated construction, the valve member 70 is tapered such that the valve seat engaging surface of the valve member is conical and defines an angle of approximately 15° with respect to the longitudinal axis of the valve bore. If the angle of the sides of the conical valve member 70 is substantially greater than 15°, for example, 30° or 45°, the valve member may wear rapidly, and the hydraulic pump will not have an extended useful life. If the angle is substantially less than 15°, the valve member 70 may become wedged in the valve bore 64 and become inoperable.

Figure 5:
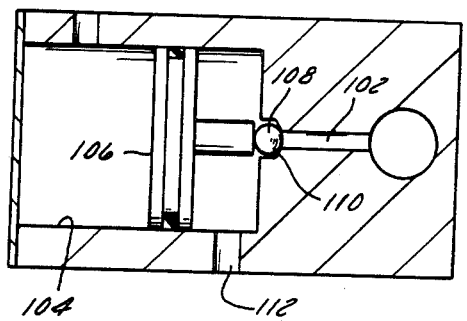
FIG. 5 is a view similar to FIG. 4 and showing a prior art hydraulic fluid venting valve.

FIG. 5 illustrates a prior art venting valve for use in prior art hydraulic fluid pumps. In prior art arrangements of the type illustrated in FIG. 5, the return of hydraulic fluid from the working hydraulic cylinder to the reservoir was provided through a narrow passage 102. During normal operation of the prior art venting valves, the hydraulic fluid pressure generated by the impeller pump was conveyed to a valve cylinder 104 housing a valve piston 106. The valve piston 106 engaged a ball 108 forcing the ball 108 into engagement with a valve seat 110. In order to maintain the ball 108 in engagement with the seat 110 during the high pressure operation of the prior art hydraulic fluid pumps, wherein high fluid pressures were generated in the fluid passage 102, it was necessary that the force generated by the large diameter valve piston 106 on the ball 108 be greater than the force generated on the ball 108 by the hydraulic fluid pressure in the small diameter bore 102. In operation of hydraulic pumps of the type illustrated in the drawings, the pressure generated in the fluid passage 102 may reach 10,000 psi. Accordingly, in order to maintain the ball 108 in engagement with the valve seat 110 during high pressure operation of the piston pump, it was necessary that the fluid passage 102 have a very small cross sectional area as compared to the cross sectional area of the valve piston 106 and cylinder 104. This small cross sectional area of the passage 102 restricted fluid flow through the passage to the venting port 112 during venting of the working hydraulic fluid cylinder and reduced the speed of operation of the hydraulic fluid pump.

The present invention is an improvement over the structures shown in FIG. 5, because in the construction shown in FIGS. 2–4 and 6, the bore 64 can be substantially larger than the bore 102 of the FIG. 5 structure, and is sufficiently large that bore 64 can permit relatively unrestricted fluid flow to the vent port 90 and will not delay draining of hydraulic fluid from the working hydraulic cylinder. This advantage is achieved because the hydraulic fluid pressure in the valve bore 64 applies a force on both of the opposite ends 70 and 84 of the spool valve 68. The hydraulic fluid pressure on the valve piston 74 is not opposed by a force caused by high hydraulic fluid pressure on the valve member 70, and the size of valve bore 64 does not have to be restricted.

Various features of the invention are set forth in the following claims.

We claim:

1. A valve assembly for controlling discharge of hydraulic fluid from a high pressure hydraulic fluid container to a hydraulic fluid reservoir, the valve assembly comprising:
    a valve body including a valve bore, said valve bore including a valve seat,
    a first inlet port communicating with said valve bore on one side of said valve seat, said first inlet port being adapted to be connected to a source of hydraulic fluid pressure,
    a first hydraulic fluid outlet port communicating with said valve bore on an opposite side of said valve seat and being adapted to communicate with the hydraulic fluid reservoir,
    a valve spool housed in said valve bore, said valve spool having opposite ends, one end of said valve spool including a valve member selectively engageable with said valve seat to prevent hydraulic fluid flow through said valve bore, said first inlet port entering said valve bore between said opposite ends of said valve spool,
    means for selectively biasing said valve member against said valve seat when the hydraulic fluid pressure supplied to the first inlet port from the source of hydraulic fluid pressure is at least a predetermined pressure, said means for biasing including a valve cylinder having opposite ends and a valve piston housed in said valve cylinder, said valve cylinder including a second inlet port adapted to be operably connected to the source of hydraulic fluid pressure, and said valve piston being operable to bias said valve member toward said valve seat when the hydraulic fluid pressure in one of said opposite ends of said valve cylinder is at least the predetermined pressure, and
    means for resiliently biasing said valve member away from said valve seat such that said valve member will move away from said valve seat when the hydraulic fluid pressure in said one of said opposite ends of said valve cylinder falls below the predetermined pressure, said means for resiliently biasing including a compression spring engaging the other of said opposite ends of said valve spool to bias said valve member away from said valve seat.

2. A valve assembly as set forth in claim 1 wherein said valve bore and said valve cylinder have a common longitudinal axis.

3. A valve assembly as set forth in claim 1 wherein said valve member includes sidewalls defining an angle of approximately 15° with respect to the longitudinal axis of said valve bore.

4. A hydraulic fluid pump for use in supplying hydraulic fluid to a hydraulic pressure vessel, the hydraulic fluid pump comprising:
    a hydraulic fluid reservoir,
    a hydraulic fluid output port,
    a low pressure pump means operably connected to said hydraulic fluid reservoir and for forcing hydraulic fluid from said hydraulic fluid reservoir to said hydraulic fluid outlet port,
    a high pressure hydraulic fluid pump means operably connected to said outlet port for providing hydraulic fluid at high pressure to said outlet port,
    means for driving said low pressure pump,
    means for driving said high pressure pump,
    means for selectively venting hydraulic fluid from said hydraulic fluid outlet port to said reservoir, said means for selectively venting including
    a valve body including a valve bore, said valve bore including a valve seat,
    a first inlet port communicating with said valve bore on one side of said valve seat, said first inlet port being connected to said hydraulic fluid outlet port,
    a first hydraulic fluid outlet port communicating with said valve bore on an opposite side of said valve seat and communicating with the hydraulic fluid reservoir,
    a valve spool housed in said valve bore, said valve spool having opposite ends, one end of said valve spool including a valve member selectively engageable with said valve seat to prevent hydraulic fluid flow through said valve bore, said first inlet port entering said valve bore between said opposite ends of said valve spool, means for selectively biasing said valve member against said valve seat when the hydraulic fluid pressure supplied to the first inlet port from the hydraulic fluid outlet port is at least a predetermined pressure, said means for biasing including a valve cylinder having opposite ends and a valve piston housed in said valve cylinder, said valve cylinder including an inlet port being operably connected to the hydraulic fluid outlet port, and said valve piston being operable to bias said valve member toward said valve seat when the hydraulic fluid pressure in one of said opposite ends of said valve cylinder is at least the predetermined pressure, and means for resiliently biasing said valve member away from said valve seat such that said valve member will move away from said valve seat when the hydraulic pressure in said valve cylinder falls below the predetermined pressure, said means for resiliently biasing including a compression spring engaging the other of said an opposite ends of said valve spool to bias said valve member away from said valve seat.

5. A valve assembly as set forth in claim 4 wherein said valve bore and said valve cylinder have a common longitudinal axis.

6. A valve assembly as set forth in claim 4 wherein said valve member includes sidewalls defining an angle of approximately 15° with respect to the longitudinal axis of said valve bore.

* * * * *